March 12, 1963     E. L. ADAMS     3,080,614
ELIMINATION OF NECK FLASH ON BLOWN PLASTIC ARTICLES
Filed Nov. 8, 1961
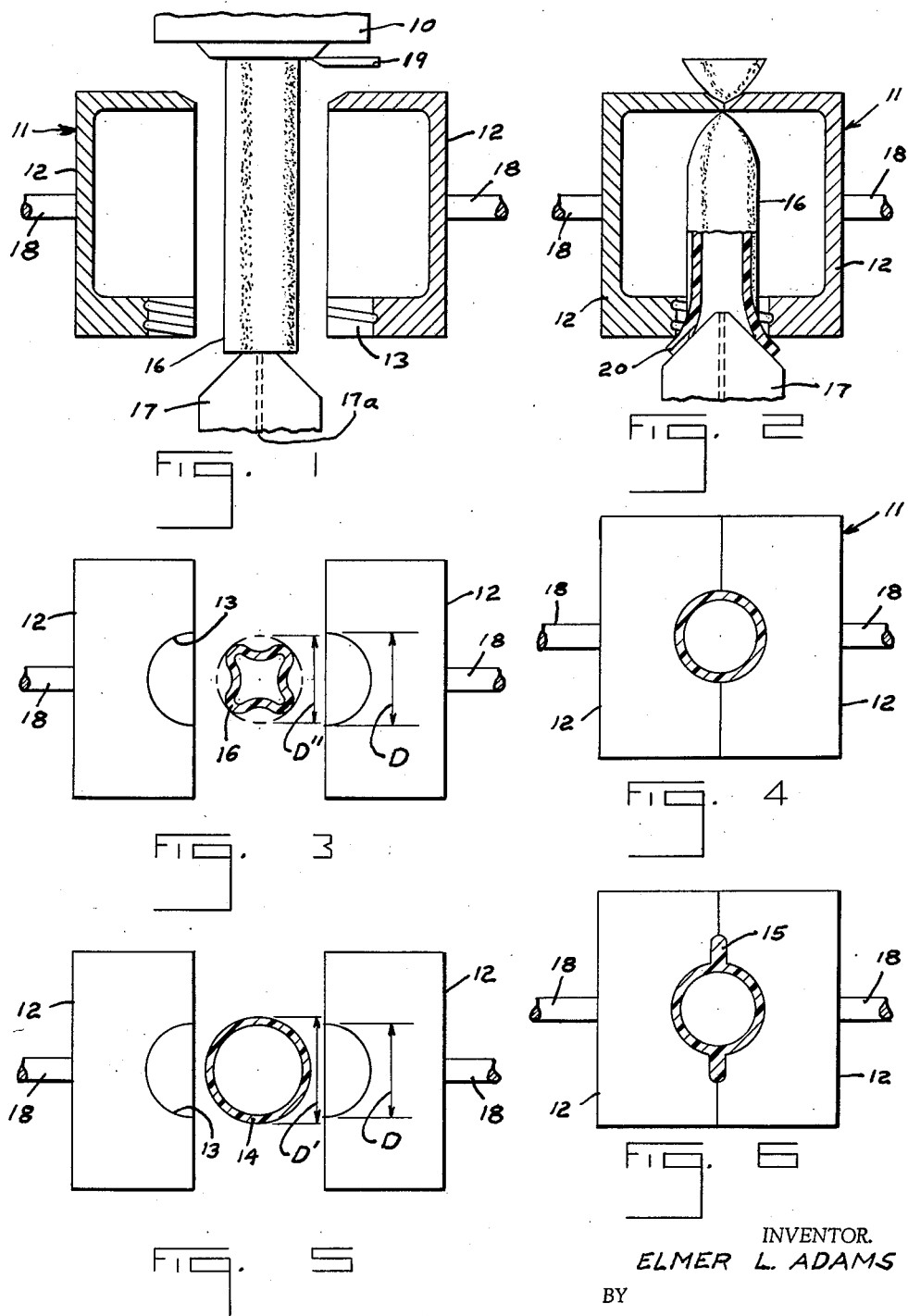
INVENTOR.
ELMER L. ADAMS
BY
CHARLES S. LYNCH
& W. A. SCHAICH
ATTORNEYS

United States Patent Office 3,080,614
Patented Mar. 12, 1963

3,080,614
ELIMINATION OF NECK FLASH ON BLOWN PLASTIC ARTICLES
Elmer L. Adams, Toledo, Ohio, assignor to Owens-Illinois Glass Company, a corporation of Ohio
Filed Nov. 8, 1961, Ser. No. 150,979
6 Claims. (Cl. 18—55)

This invention relates to a method of producing hollow plastic articles having relatively small portions in some areas and substantially larger portions in other areas and more particularly to a method of eliminating undesirable neck flash which frequently results during the production of containers having a small neck portion and a substantially larger body portion.

In the manufacture of hollow plastic articles it is conventional to extrude heated thermoplastic material from an extrusion head in the form of tubing. This tubing is placed between the open halves of a partible blow mold. The mold halves are then closed around such tubing and the tubing thus enclosed is expanded to conform to the mold cavity. It is quite obvious that the expansion of such tubing in the mold cavity results in a blown article having considerably thinner walls than did the tubing from which it was blown. The greater the periphery of the mold cavity with respect to the periphery of the extruded tubing, the greater will be the reduction in wall thickness.

When the cross-sectional size of the mold cavity is fairly large, one of two methods has generally been used heretofore to provide a sufficient amount of thermoplastic material so as to preclude the finished hollow article from having excessively thin wall portions. One of these methods has been to increase the wall thickness of the extruded tubing by decreasing the inside diameter. Under this method the outside diameter is sufficiently small to permit the neck portion of the partible mold to close around the tubing without pinching such tubing. Although this method eliminates the problem of neck flash which would result had the tubing been pinched, it creates other problems in that, first, the inside diameter of such thick walled tubing is generally smaller than the desired inside diameter of the neck portion of the finished article and therefore must be reamed out to such desired diameter, and, second, substantial difficulty is encountered in expanding such thick-walled tubing in the mold cavity and particularly in filling the neck mold portions of such cavity. For these reasons, the most frequently used method of providing sufficient thermoplastic material has been to increase the diameter but not the wall thickness of such tubing.

The problem with increasing the tubing diameter is that when the mold sections close around such tubing, the neck portion of the mold, which is then smaller than the tubing, pinches the tubing forming objectionable flash which must be removed from the hollow article. Such removal requires either an additional processing step of trimming the flash or expensive modifications to the equipment to accomplish the trimming concurrently with the forming process. In any event, trimming increases the cost of producing hollow plastic articles, and, in the case of containers the resultant article is less attractive because the flash can never be smoothly trimmed from the threaded portions of the neck.

Accordingly, it is an object of this invention to disclose an improved method of producing plastic articles wherein the aforementioned difficulties are overcome.

Another object of this invention is to provide a method whereby hollow plastic articles having relatively small neck portions may be formed without objectionable neck flash.

A further object of this invention is to provide a method of extruding thermoplastic tubing (1) having optimum wall thickness to permit expansion in a partible mold while at the same time furnishing a sufficient amount of thermoplastic material to form a hollow article which has a relatively large body portion, and (2) which may be received within the neck portion of such partible mold without pinching.

The specific nature of this invention, as well as other objects and advantages thereof, will become apparent to those skilled in the art from the following detailed description taken in conjunction with the annexed sheet of drawings, on which is illustrated the preferred embodiment of this invention.

In the accompanying drawings:

FIGURE 1 is a schematic view partly in section of apparatus for the production of plastic containers showing a section of extruded tubing produced in accordance with the method of this invention, positioned between the open halves of a partible blow mold.

FIGURE 2 is a view similar to FIGURE 1 showing the sections of the partible mold in a closed position.

FIGURE 3 is a bottom view of the open mold sections with the tubing positioned therebetween.

FIGURE 4 is a bottom view of the closed mold sections showing the tubing expanded to conform to the molding cavity.

FIGURE 5 is a bottom plan view of a conventional method wherein the extruded tubing is larger than the neck portion of the mold sections and showing the mold sections in an open position.

FIGURE 6 is a view similar to FIGURE 5 showing the mold sections closed around the tubing and showing the tubing pinched by the neck portion.

Referring particularly to FIGURES 1 through 4, there is shown an extrusion head 10 from which heated thermoplastic material issues in the form of tubing 16 having the unique cross-sectional configuration hereinafter described. A blow mold generally designated 11, comprising mold sections or halves 12, is positioned under extrusion head 10. The apparatus normally employs fluid actuated cylinders (not shown) connected to pistons 18 which move mold sections 12 into an open and closed position. In addition, a vertically retractable blow pipe 17 is provided which is connected to a fluid cylinder (not shown). The blow pipe 17 permits the entrance of air under pressure through channel 17ª to expand the thermoplastic tubing 16 in mold sections 12. A knife 19, having a fairly sharp edge, is positioned under extrusion head 10 to sever tubing 16 from extrusion head 10 in such manner as to leave the lower end thereof open. Each mold section 12 has a semi-circular neck portion 13, which neck portions cooperate to determine the neck portion of a hollow article which is blown in mold 11. For clarity, the diameter of neck portion 13 has been designated with the letter D.

Referring briefly to FIGURE 5, there is shown a length of thermoplastic tubing 14 which has been extruded in the conventional form positioned between the open sections 12 of blow mold 11. The diameter D of neck portion 13 is the same as that indicated for the apparatus of FIGURES 1 through 4. The diameter D' of tubing 14 is larger than the diameter D of neck portion 13 in order to provide sufficient material for the formation of the body portion of the container. Consequently, when the mold sections 12 are closed around tubing 14 (FIGURE 6), flash 15 occurs around the neck of the container. This flash results when the small diameter D of neck portions 13, upon closing of mold sections 12, attempt to encircle the larger diameter D' of tubing 14 and thereby pinch tubing 14. As previously noted, such neck flash 15 must be trimmed in order to produce a finished article.

In accordance with this invention, the tubing is proportioned to provide a sufficient amount of thermoplastic material for the forming of relatively large containers without the prior art problems of neck flash and excessive wall thickness. Heated thermoplastic material is extruded in the form of tubing having a non-circular cross-sectional contour which in outline does not exceed the cross-sectional outline of the neck of the desired container but which has a periphery substantially greater than such neck. One such cross-sectional configuration is shown in FIGURE 3, where there is shown tubing 16 having a corrugated periphery so as to incorporate substantially the same amount of thermoplastic material per unit length as the cylindrical tubing 14 (FIGURE 5). By way of example for the purpose of comparing with tubing 14, this cross-sectional configuration may be described as having a maximum diameter D″ substantially less than the diameter D′ of tubing 14, yet having a periphery and wall thickness substantially equal to that of tubing 14. It is quite obvious that such tubing 16 having substantially equal periphery and wall thickness as tubing 14 will provide substantially the same amount of thermoplastic material per unit length as tubing 14.

Inasmuch as the above example was for the purpose of comparing tubing 16 with tubing 14, the diameter D″ was described as smaller than the diameter D′ of tubing 14. However, for the purpose of this invention the outlined diameter D″ of tubing 16 must not be greater than the minimum diameter D of neck mold portions 13. By the same token the periphery of tubing 16 must be substantially greater than the periphery of cooperating neck mold portions 13. Having the outlined diameter D″ of tubing 16 smaller than the diameter D of neck portion 13 permits the mold sections 12 to close around tubing 16 without pinching. Because tubing 16 is not pinched by the neck portion 13 of mold sections 12 no undesirable flash is produced on the neck portion of the resulting hollow article, as was produced in the prior art example (FIGURE 6) where the diameter of the extruded tubing was larger than the diameter of the neck portion.

The absence of such neck flash permits the manufacture of hollow articles without the costly step of trimming the neck flash, as is required in the previous known art. That such trimming is not required when the method of this invention is utilized is evident from viewing FIGURE 4, wherein the tubing 16 has been expanded in the mold cavity of blow mold 11 with the complete absence of objectionable flash.

In the operation of this invention, heated thermoplastic material is extruded from any conventional extrusion head 10 having an orifice so contoured to form tubing 16 having a cross-sectional configuration as heretofore described and may be blow molded by any known method. For example, tubing 16 may be positioned between the open sections 12 of mold 11. Pistons 18 operated by fluid pressure cylinders (not shown) are actuated to close mold sections 12 around tubing 16. Upon closing of mold sections 12, knife 19 is actuated by any means (not shown) to sever tubing 16 from extrusion head 10. In this position tubing 16 is supported by the abutting edges at the top of mold sections 12, which abutting edges pinch tubing 16 (FIGURE 2). Retractable blow pipe 17 is then raised by the fluid cylinder (not shown) to engage the lower open end of tubing 16.

Blow pipe 17 terminates in a truncated cone section with its upper end having a smaller diameter than the smallest open portion of tubing 16 and its larger portion having a larger diameter than neck portion 13. Such construction permits the upper end of blow pipe 17 to enter the lower open end of tubing 16 and, as blow pipe 17 is raised, to force the walls of tubing 16 into sealing engagement with the lower edge of the neck portion 13 (FIGURE 2). In this manner the one end of tubing 16 is closed to permit its expansion by fluid pressure through channel 17ª.

After tubing 16 is expanded to conform to the mold cavity of blow mold 11, mold sections 12 are opened, the hollow article thus formed is removed, and the apparatus returns to receive the next length of thermoplastic material.

The above example illustrating the operation of this invention was described in conjunction with a knife of the type designated 19 whose operation severed tubing 16 in such manner as to leave the lower end open. However, it should be understood that this invention is not limited in scope to tubing having its lower end open as the methods herein disclosed are equally effective whether the lower end of tubing 16 is open or closed. Thus, the tubing could be placed between the halves of a partible mold of the type which, upon closing, seals both ends of said tubing. In such case a needle type blow pipe, of the type described in U.S. Patent No. 2,579,390, is provided to pierce the wall of said tubing near one end thereof and introduce pressured fluid to expand said tubing.

From the above description it can be easily seen that my invention provides an efficient and inexpensive method of supplying sufficient quantities of heated thermoplastic material to form plastic containers having relatively large body portions as compared with relatively small neck portions in such a manner as to overcome the difficulties encountered in the prior art.

Although the foregoing examples have been directed at producing containers, it is obvious that the methods of this invention can be used for producing many types of hollow articles having one portion of substantially greater periphery than another.

Further, although FIGURE 3 shows one cross-sectional configuration which may be utilized, it must be understood that this invention is not limited to such configuration as numerous configurations could obviously be used so long as the cross-sectional outline of the tubing is not greater than the internal outline of the minimum portion of the blow mold cavity. It is, therefore, not the purpose to limit the patent granted hereon otherwise than necessitated by the scope of the appended claims.

I claim:

1. The method of forming hollow plastic articles of the type having at least one body portion of substantially greater wall thickness and smaller cross-sectional area than another portion, comprising forming a tubular formation of heated thermoplastic material, said formation having a non-circular cross-sectional contour not exceeding in outlined area that of said one body portion of the finished article but having a periphery substantially greater than that of said one body portion of the finished article, enclosing a length of said tubular formation in a blow mold having a cavity corresponding to the external configuration of the finished article, and expanding said tubular formation to conform to said blow mold cavity.

2. The method of forming hollow plastic articles of the type having a neck portion and a substantially larger body portion comprising forming a tubular formation of heated thermoplastic material, said formation having a non-symmetrical cross-sectional contour which in outline does not exceed the minimum cross-sectional outline of said neck portion but has a periphery substantially greater than the periphery of said neck portion, enclosing a length of said tubular formation in a blow mold having a cavity corresponding to the external configuration of the finished article, and expanding said tubular formation to conform to said blow mold cavity.

3. In the method of blow molding narrow neck containers by expansion of a heated thermoplastic parison in a blow mold, the improvement comprising the step of forming said parison as a hollow tubular formation having a non-circular cross-sectional contour which in outline does not exceed the minimum cross-sectional outline of the neck of the desired container but which has a periphery substantially greater than said neck.

4. The method of forming hollow plastic articles of the type having a neck portion and a substantially larger body portion comprising forming a tubular formation of heated thermoplastic material, said formation having a cross-sectional contour defining a closed corrugated loop, said loop being of such configuration that the maximum spaced apart straight line distance of any two opposed points on said loop is less than the minimum diameter of said neck portion, enclosing a length of said tubular formation in a blow mold having a cavity corresponding to the external configuration of the finished article, and expanding said tubular formation to conform to said blow mold cavity.

5. In the method of expanding a heated thermoplastic parison in a partible blow mold to form a hollow plastic article, said blow mold having a neck defining portion and a larger body defining portion, the improvement comprising the step of forming said parison as a hollow tubular formation having a cross-sectional contour defining a closed corrugated loop, the spaced apart straight line distance of any two opposed points on said loop being less than the corresponding spaced apart straight line distance of said neck defining portion of said blow mold.

6. The method of forming hollow plastic articles of the type having at least one body portion of substantially greater wall thickness and smaller cross-sectional area than another portion, comprising forming a tubular formation of heated thermoplastic material, said formation having a cross-sectional contour defining a closed corrugated loop, said loop being of such configuration that the spaced apart straight line distance of any two opposed points on said loop is less than the corresponding spaced apart straight line distance of said one body portion, enclosing a length of said tubular formation in a blow mold having a cavity corresponding to the external configuration of the finished article, and expanding said tubular formation to conform to said blow mold cavity.

References Cited in the file of this patent
UNITED STATES PATENTS

| | | |
|---|---|---|
| 2,750,625 | Colombo | June 19, 1956 |
| 2,935,764 | Mason | May 10, 1960 |
| 2,964,795 | Schaich | Dec. 20, 1960 |
| 3,012,286 | Gasmire | Dec. 12, 1961 |
| 3,019,481 | Negoro | Feb. 6, 1962 |